Patented Apr. 10, 1934

1,954,389

UNITED STATES PATENT OFFICE 1,954,389

PROCESS OF MANUFACTURING OPTICALLY ACTIVE MONO-HYDROXYPHENYL METHYLAMINO-ETHANOLS-1

Helmut Legerlotz, Berlin, Germany, assignor to Frederick Stearns & Company, Detroit, Mich.

No Drawing. Application May 24, 1930, Serial No. 455,465. In Germany May 27, 1929

6 Claims. (Cl. 260—128)

This invention refers to the manufacture of optically active hydroxylated aromatic alkamines, and in particular to mono-hydroxy-phenyl-alkamines and it devises means for obtaining highly valuable, and therapeutically active compounds of the class referred by comparatively simple and efficient methods of manufacture. Improved means of obtaining the corresponding racemic bodies have been disclosed by my United States Patents Nos. 1,903,927 and 1,932,347, so that these important and valuable products have now become easily accessible. It has been ascertained that the corresponding racemic bodies exhibit highly valuable therapeutic and generally medicinal properties, inasmuch as they constitute vasoconstrictive and analeptic remedies of but limited poisonous character. In the further course of my experiments it has been found that these valuable properties of the racemic bodies referred to are due to certain active components thereof one of which is particularly active, while the remaining constituents or the other component of the original racemic body are almost without therapeutic action, while exhibiting considerable increased poisonous qualities. It is evident, therefore, that the conversion or the splitting up of the racemic bodies into optically active isomeric components is of great industrial and therapeutic importance, inasmuch as it provides means of reducing or minimizing the poisonous qualities and of increasing the medicinal activity. The conversion or the splitting up of the racemic bodies is effected according to my invention by the treatment with optically active acids, such as for instance optically active tartaric acid, bromine-camphor-sulphonic acid, corydalinosulphonic acid and equivalent acids and salts or other combinations of these acids. It has been ascertained that the active components on the other hand may be converted into the corresponding racemic compounds by heating them with, preferably strong, organic or inorganic acids with nearly quantitative yields, and by proceeding in this manner it is possible to convert the racemic bodies of the class referred to substantially completely into the therapeutically valuable isomeric components. Broadly considered the process according to this invention comprises the treatment of the alkamine bases mentioned with free acids of optically active bodies, or the treatment of the salts of the racemic bodies with the salts of the optically active reagents and with the assistance of suitable solvents. In the case of the treatment of the basic racemic body itself with an acid, as for instance with bromine-camphorsulphonic acid, care should be taken to provide for a slight excess of the acid, so that the reaction will then take place in the presence of an acid.

In carrying out my invention I may for instance proceed in accordance with the following mentioned examples.

*Example I.*—31.7 grammes para-hydroxyphenyl-ethanol-methylamine

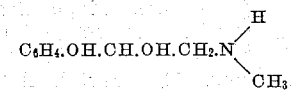

are suspended in about 50 cc. of water, and are dissolved with the calculated amount of hydrochloric acid, and to the hot solution of the salt obtained a hot concentrated aqueous solution of 62 grammes bromine-camphor-sulphonate of ammonia are added. Upon allowing the mixture to cool the crude bromine-camphor-sulphonate salt of the dextro component becomes separated and it is obtained in the pure condition, after having been dissolved in hot water and re-concentrated three to four times. The lævo-body possesses the above mentioned valuable therapeutic properties; it is substantially contained in the mother liquor from the first crystallization. It is obtained from this liquor by concentrating it, dissolving the residue in dilute alcohol, and recovering the salt produced which constitutes the bromine-camphor-sulfonate of the said lævo hydroxy-phenyl-ethanol methylamine.

The free bases may be obtained from their salts by keeping them suspended in a small amount of water, adding concentrated ammonia in excess thereto, and then treating the resulting solution with solid sodium-chloride. By this means the optically active bases are precipitated which are readily soluble in water as distinguished from the racemic bodies. These optic isomers melt at 180 degrees centigrade and have a specific rotary power of ±62.2 degrees.

*Example II.*—1.3 grammes dextro-para-hydroxyphenyl-ethanol-methyl-amine are dissolved in 11 cc. normal-HCl, sufficient water being added to obtain 25 cc. of liquid. The solution which in a tube of 1.88 decimeter length shows a rotation of +6.0, has become completely inactive after having been heated for two hours on a boiling water-bath. By precipitation with ammonia the racemic base may be obtained at a very good yield.

*Example III.*—27 grammes dextro-tartaric acid and 30 grammes para-hydroxy-phenyl-methyl-amino-ethanol-1 are dissolved in boiling 90 percent alcohol. The bitartrate crystallizing from the cooled solution is then fractionally recrystalized, and that fraction which shows the greatest rotation is dissolved several times from 80-percent methanol until the rotation becomes constant. The base obtained from the bitartrate has been found to be identical with the lævo base obtained by the first example.

*Example IV.*—20.4 grammes para-hydroxyphenyl-methyl-amino-ethanol-1 and 23.2 grammes dextro-camphor-sulphonic acid are treated with 50 cc. benzol. Then the mixture is heated upon a boiling water-bath and acetone is added thereto, until a clear solution is obtained. After the mixture has been kept standing for some time, dextro - para - hydroxyphenyl - methyl - amino - ethanol - 1 - camphor - sulphonate is obtained. From this salt the base may be obtained which after re-crystallization has been identified as the dextro-para-hydroxyphenyl-methylamino-ethanol-1-hydrochloride.

*Example V.*—16.8 grammes dextro-bromine-camphor-sulphonate of ammonia and 10.8 grammes ortho - hydroxyphenyl - methylamino-ethanol-1-hydrochloride are heated with 25 cc. water, until complete solution is obtained. On cooling the dextro-bromine-camphor-sulfonate salt of the ortho-hydroxyphenyl-methylamino-ethanol-1 crystallizes out which is sucked off after 24 hours. For the purpose of purification it is re-crystallized until constant rotation is obtained which is the case after two dissolving and crystallizing operations. By precipitating it with ammonia with the addition of some ordinary salt pure dextro-ortho-hydroxyphenyl-methylamino-ethanol is obtained therefrom.

*Example VI.*—16.3 grammes para-hydroxyphenyl-ethanol-methylamine are rubbed up with a small amount of water or of alcohol (or other solvents may be used), and to this is added a solution of, for instance 31.5 grammes (that is to say more than one molecule, so as to insure acid reaction) free dextro-bromine-camphor-sulphonic acid. From this distinctly acid solution the difficultly soluble dextro-para-hydroxyphenyl - ethanol - methylamine-dextro-bromine-camphor-sulphonate salt is separated out and is removed. By now evaporating the mother-liquor, the entire base is separated out therefrom after cooling in form of the dextro-salt mentioned, so that by operating in this manner the original racemic body is converted into only one optic component in only one operation. It should, of course, be noted that as an intermediate product the racemic body will of course be formed by the action of the acid solvent.

If in the case of this Example VI the lævo-acid is used instead of the dextro-bromine-camphor-sulphonic acid, the sulphonate salt of the lævo-rotating para - hydroxyphenyl - ethanol-methylamine is first precipitated, and the same salt is obtained by evaporating the mother liquors. In this case the lævo-body is the difficultly soluble component which is crystallized out, and the dextro-body remains in the mother liquor, is converted into the racemic body, and then into the lævo isomeric body in a similar manner as above described with regard to the conversion into the dextro-body. Thus it is possible to convert the racemic body almost quantitatively in practically one operation into only one of the optically active components.

The conversion is assisted by using optically active acids and salts of strong acid reaction and properties.

It is obviously also possible to convert the dextro-body into the lævo-body and inversely by racemizing said body, then splitting it up with the corresponding optically active acid or its salts of which the ammonia salt is, for instance one of the most convenient compounds.

It should, of course, be understood that the invention is not limited to any proportions, time of treatment and nature of ingredients, and it may find expression in other embodiments aside from those herein specified for the sake of exemplification and illustration only, and without thereby deviating from the principles and the scope of the invention, except as otherwise appears from the appended claims.

I claim:

1. As new products optically active isomers of mono-hydroxy-phenyl-methyl-amino-ethanols-1 of vaso-constrictive and analeptic therapeutic properties and of greater solubility in solvents than the corresponding racemic bodies.

2. As new products optically active water-soluble salts of optically active mono-hydroxy-phenyl-methyl-amino-ethanols-1 convertible into the corresponding racemic isomers by the action of bromine-camphor-sulfonic acid.

3. As new products optically active isomers of para-mono-hydroxy-phenyl-methyl-amino-ethanols-1 having basic character, and showing but a low degree of poisonous qualities.

4. As a new product lævo-rotary para-mono-hydroxy-phenyl-methyl-amino-ethanol-1, having substantially non-poisonous qualities, melting at 180° C. and showing a rotary power of —62.2.

5. The method of making optically active mono-hydroxy-phenyl-methyl-amino-ethanol-1, which consists in mixing racemic mono-hydroxy-phenyl-methyl-amino-ethanol-1 with more than one molecule of an optically active bromine-camphor-sulfonic acid per molecule of racemic mono-hydroxy-phenyl-methyl-amino-ethanol-1 in the presence of an inert solvent, separating from the reaction mixture the difficultly soluble salt of the optically active mono-hydroxy-phenyl-methyl-amino-ethanol-1 with bromine-camphor-sulfonic acid obtained, concentrating the solution obtained after said separation by heating and separating the difficultly soluble salt of the optically active mono-hydroxy-phenyl-methyl-amino-ethanol-1 with bromine-camphor-sulfonic acid from the concentrate, thereby obtaining the same optically active salt as in the first separation step.

6. The method of making optically active mono-hydroxy-phenyl-methyl-amino-ethanol-1, which consists in mixing racemic mono-hydroxy-phenyl-methyl-amino-ethanol-1 with more than one molecule of an optically active bromine-camphor-sulfonic acid per molecule of racemic mono-hydroxy-phenyl-methyl-amino-ethanol-1 in the presence of an inert solvent, separating from the reaction mixture the difficultly soluble salt of the optically active mono-hydroxy-phenyl-methyl-amino-ethanol-1 with bromine-camphor-sulfonic acid obtained, concentrating the solution obtained after said separation by heating and separating the difficultly soluble salt of the optically active mono-hydroxy-phenyl-methyl-amino-ethanol-1 with bromine-camphor-sulfonic acid from the concentrate, thereby obtaining the same optically active salt as in the first separation step, and repeating said separation until the entire amount of the racemic mono-hydroxy-phenyl-methyl-amino-ethanol-1 introduced into the process is converted into one and the same optically active salt of mono-hydroxy-phenyl-methyl-amino-ethanol-1 with bromine-camphor-sulfonic acid.

HELMUT LEGERLOTZ.